United States Patent [19]

Paton

[11] Patent Number: 4,662,615

[45] Date of Patent: May 5, 1987

[54] SUSPENSION STRUT

[76] Inventor: H. Neil Paton, 2521 W. Montlake Pl. East, Seattle, Wash. 98112

[21] Appl. No.: 854,697

[22] Filed: Apr. 22, 1986

Related U.S. Application Data

[63] Continuation of Ser. No. 587,521, Mar. 8, 1984, abandoned.

[51] Int. Cl.$^4$ ............................................. F16F 11/00
[52] U.S. Cl. .................................. 267/64.24; 248/562; 248/636; 267/134; 267/140.1
[58] Field of Search .................. 188/67, 129, 271; 267/64.15, 64.19, 64.21, 64.23, 64.24, 64.27, 134, 140.1; 277/116.2, 117, 118, 119, 120, 121, 122, 190, 191; 248/562, 631, 636

[56] References Cited

U.S. PATENT DOCUMENTS

| Re. 20,030 | 7/1936 | Ledwinka | 280/106 |
|---|---|---|---|
| 769,841 | 9/1904 | Shepard | 267/9 C |
| 1,050,870 | 1/1913 | Stickley | 222/122 X |
| 1,169,625 | 1/1916 | Dryer | 267/8 R |
| 1,510,017 | 9/1924 | Schmidt | 267/9 C |
| 1,696,478 | 12/1928 | Hall | 267/9 A X |
| 2,231,332 | 2/1941 | Griepenstroh | 267/64.15 |
| 2,381,404 | 8/1945 | Cottrell | 267/8 R |
| 2,490,738 | 12/1949 | Lehrman | 267/9 C |
| 2,497,829 | 2/1950 | Baselt | 267/8 R |
| 2,516,072 | 7/1950 | Piron | 267/9 C |
| 2,534,419 | 12/1950 | Dath | 267/9 C |
| 2,549,036 | 4/1951 | Withall | 267/9 C |
| 2,552,668 | 5/1951 | Dath | 267/9 C |
| 2,574,788 | 11/1951 | Janeway et al. | 267/9 R |
| 2,614,831 | 10/1952 | Withall | 267/9 C |
| 2,752,149 | 6/1956 | Forcellini | 267/9 C |
| 2,753,177 | 7/1956 | Boyd | 267/9 C |
| 2,767,858 | 10/1956 | Fillion | 213/45 |
| 2,814,392 | 11/1957 | Campbell | 213/33 |
| 2,819,060 | 1/1958 | Neidhart | 267/63 R |
| 2,841,292 | 7/1958 | Campbell | 213/32 |
| 2,844,366 | 7/1958 | Butterfield | 267/9 C |
| 3,039,757 | 6/1962 | Barr | 267/63 R |
| 3,054,478 | 9/1962 | Rumsey | 188/129 X |
| 3,145,012 | 8/1964 | Kfoury | 248/358 |
| 3,161,420 | 12/1964 | Rix | 280/124 |
| 3,178,036 | 4/1965 | Cardwell | 213/33 |
| 3,372,947 | 3/1968 | Donnecke | 280/124 |
| 3,402,924 | 9/1968 | Rix | 267/63 R |
| 3,409,284 | 11/1968 | Rix | 267/63 R |
| 3,417,986 | 12/1968 | Fuke | 267/33 |
| 3,434,708 | 3/1969 | Hawk, Jr. | 267/63 R |
| 3,480,268 | 11/1969 | Fishbaugh | 267/63 R |
| 3,537,696 | 11/1970 | Webster, Jr. | 267/63 R |
| 3,640,545 | 2/1972 | Citroen | 280/124 |

(List continued on next page.)

FOREIGN PATENT DOCUMENTS

| 1430178 | 1/1970 | Fed. Rep. of Germany | 267/9 R |
|---|---|---|---|
| 2553890 | 6/1977 | Fed. Rep. of Germany | . |
| 1803417 | 5/1978 | Fed. Rep. of Germany | 188/271 |
| 2920185 | 12/1979 | Fed. Rep. of Germany | 267/64.24 |
| 553706 | 1/1957 | Italy | . |
| 157848 | 9/1978 | Netherlands | 188/321.11 |
| 354991 | 6/1961 | Switzerland | . |
| 709080 | 5/1954 | United Kingdom | . |
| 771392 | 4/1957 | United Kingdom | . |
| 832878 | 4/1960 | United Kingdom | . |
| 1238641 | 7/1971 | United Kingdom | . |
| 1489473 | 10/1977 | United Kingdom | . |

OTHER PUBLICATIONS

Statement Under 37 C.F.R. §1.56 for Ser. No. 349,582, filed Aug. 19, 1982, issuing as U.S. Pat. No. 4,473,216.
Statement Under 37 C.F.R. §1.56 for Ser. No. 349,583, filed Aug. 19, 1982, issuing as U.S. Pat. No. 4,475,722.
Supplemental Statement Under 37 C.F.R. §1.56 for Ser. No. 349,582, filed Mar. 10, 1983, issuing as U.S. Pat. No. 4,473,216.

Primary Examiner—George E. A. Halvosa
Attorney, Agent, or Firm—Finnegan, Henderson, Farabow, Garrett & Dunner

[57] ABSTRACT

A frictional damping assembly operated by a load bearing air spring together provide damped, pneumatic load bearing support for a telescoping load bearing assembly. The strut is particularly suitable for use in front and/or rear suspensions of passenger vehicles.

6 Claims, 2 Drawing Figures

U.S. PATENT DOCUMENTS

| | | | |
|---|---|---|---|
| 3,643,765 | 2/1972 | Hanchen | 188/67 X |
| 3,677,535 | 7/1972 | Beck | 267/63 R |
| 3,713,516 | 1/1973 | Freyler | 188/129 |
| 3,762,694 | 10/1973 | MacDonnell | 267/3 |
| 3,784,179 | 1/1974 | Sugiura | 267/35 |
| 3,820,634 | 6/1974 | Poe | 188/1 C |
| 4,010,940 | 3/1977 | Freyler | 267/9 B |
| 4,032,125 | 6/1977 | Minakawa et al. | 267/63 A |
| 4,078,778 | 3/1978 | Hubweber | 188/67 X |
| 4,089,511 | 5/1978 | Palmer | 267/8 R |
| 4,105,222 | 8/1978 | Buchwald | 280/668 |
| 4,106,596 | 8/1978 | Hausmann | 188/314 |
| 4,140,304 | 2/1979 | Ghrist | 267/63 R |
| 4,230,047 | 10/1980 | Wiebe | 105/197 D |
| 4,331,224 | 5/1982 | Sano | 188/322.17 X |
| 4,332,397 | 6/1982 | Steger | 280/693 |
| 4,358,096 | 11/1982 | Paton | 267/9 C |
| 4,364,582 | 12/1982 | Takahashi et al. | 267/64.23 X |
| 4,415,146 | 11/1983 | Sitko | 267/9 C |
| 4,473,216 | 9/1984 | Paton et al. | 267/9 C |
| 4,475,722 | 10/1984 | Paton et al. | 267/9 C |

U.S. Patent  May 5, 1987  4,662,615
FIG. 1
FIG. 2
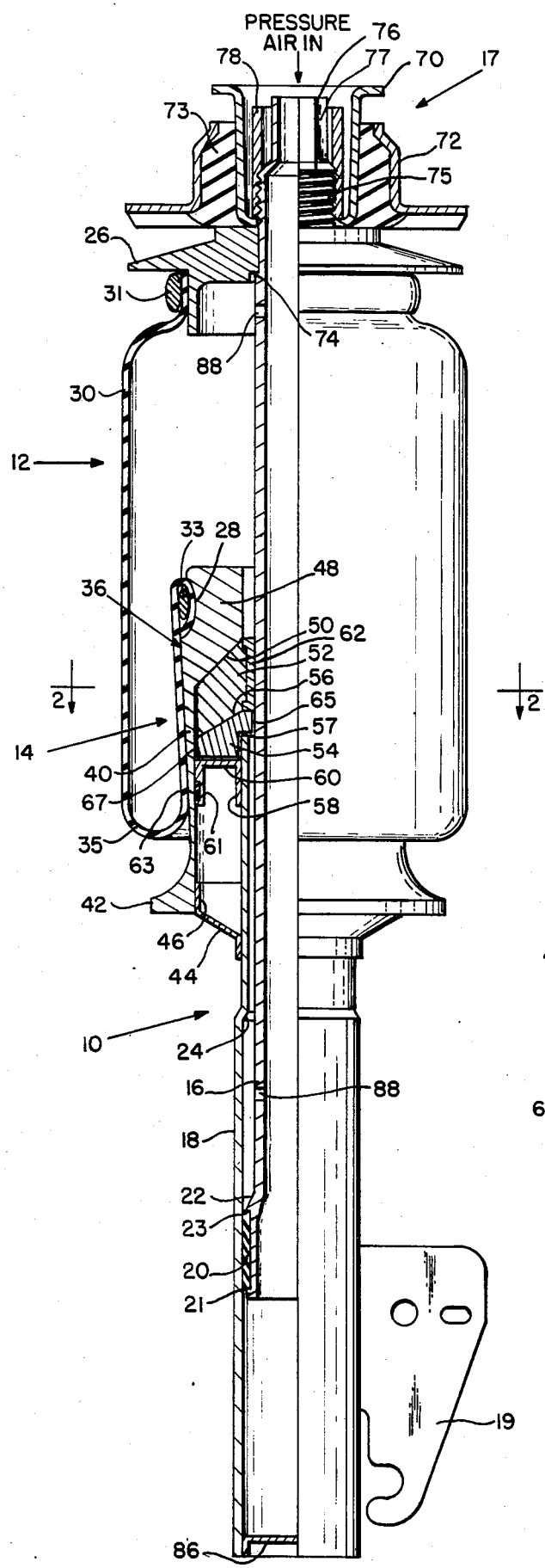
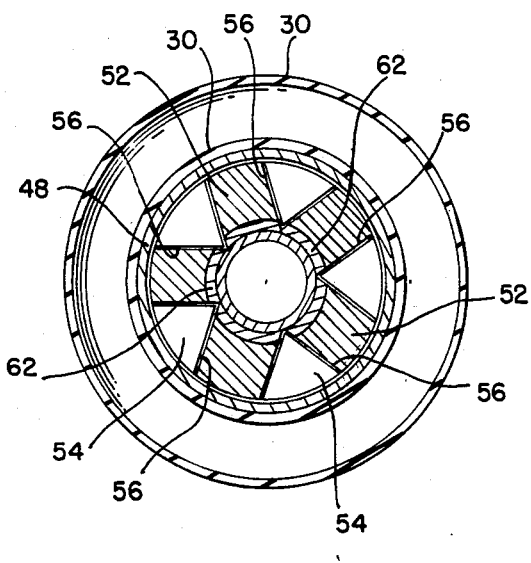

SUSPENSION STRUT

This application is a continuation, of application Ser. No. 587,521, filed Mar. 8, 1984, now abandoned.

BACKGROUND OF THE INVENTION

This invention relates to vehicle suspensions and, more particularly, to strut type vehicle suspension. While one presently preferred embodiment of the invention is disclosed herein for application as front and/or rear suspensions of passenger vehicles, the invention is not limited to such applications and may be used with other types of suspensions and vehicles.

MacPherson type suspension struts having air springs as the load bearing element offer improved ride comfort in some vehicle suspensions. These struts, however, include hydraulic shock absorbers that often tend to be unsatisfactory due to temperature sensitivity, complexity and other factors.

SUMMARY OF THE INVENTION

An object of this invention is to provide a suspension strut that combines frictional damping and pneumatic load bearing effects.

Another object is to provide a suspension strut having improved frictional damping means.

Another object of this invention is to provide a suspension strut that includes improved frictional damping means and air spring means unaffected by rotative movement of a telescoping load bearing assembly.

Another object of this invention is to provide a suspension strut that includes easily replaceable air spring means.

Another object of this invention is to provide a suspension strut that includes simplified bearing means acting between telescoping load bearing members.

Another object of this invention is to provide a suspension strut that includes a telescoping load bearing assembly resistive to the effects of bending loads.

Another object of this invention is to provide a suspension strut that includes a telescoping load bearing assembly having a simplified assembly connection.

Still another object of this invention is to provide a frictionally damped suspension strut having an overall length, diameter, and general configuration such that it is adaptable for use within the length, wheel clearance, and other requirements associated with MacPherson type struts with air springs that are or may be used in the front and/or rear suspensions of passenger cars.

To achieve these objects in accordance with the principles of this invention, this invention provides an improved suspension strut that comprises a telescoping load bearing assembly extending through load bearing air spring means and force responsive frictional damping means that are operative, respectively, to provide pneumatic load bearing support for and dampen telescopic movement of the load bearing assembly when it is subjected to an axial load. The damping means are operated by the air spring means and are interposed between the air spring means and the load bearing assembly.

Among the advantages of this invention are that: it is fluid-free and therefore does not require hydraulic valving or seals; it is relatively insensitive to temperature; through controlled, progressive wear of the frictional wear elements damping is self compensating for wear and is wear-discernable; it has fewer parts and therefore is more economical to fabricate and is more reliable than hydraulic struts; it is economical to service and maintain; it may be tailored for specific ride conditions and loads; and the air spring means can be used to control height levels.

These and other features, objects and advantages of the present invention will become apparent from the detailed description and claims to follow, taken in conjunction with the accompanying drawings in which like parts bear like reference numerals.

BRIEF DESCRIPTION OF THE DRAWINGS

FIG. 1 is a perspective view, partially in longitudinal section, of one presently preferred embodiment of the suspension strut of this invention;

FIG. 2 is a section taken along the line 2—2 in FIG. 1.

DETAILED DESCRIPTION OF THE DRAWINGS

Referring to FIG. 1, one presently preferred embodiment of the suspension strut of this invention comprises a telescoping load bearing assembly (generally referenced by numeral 10) that extends through an air spring assembly (generally referenced by numeral 12) and a force responsive frictional damping assembly (generally referenced by numeral 14). The air spring assembly 12 and the damping assembly 14 respectively provide pneumatic load bearing support for and dampen telescopic movement of the load bearing assembly 10. The damping assembly 14 is operated by the air spring assembly 12. With this construction, the ride frequency obtained (i.e., the frequency at which the vehicle body or sprung mass oscillates with respect to the wheel) remains substantially constant within a predetermined load range. As the front and/or rear suspension of a passenger vehicle, this load range may be selected so that it corresponds to the optimum load range of the vehicle.

The load bearing assembly 10 includes two telescopically movable tubular members, an inner member 16 and an outer member 18, adapted to extend and contract reciprocatively from a design position (FIG. 1) toward an extended rebound position and a contracted jounce position, respectively. The inner ends of these members are telescopically movable a distance related to the lengths of the rebound and jounce strokes of the load bearing assembly. The outer ends of these members are adapted to be secured to a vehicle; in the example, the outer end of member 16 is adapted to be secured to a vehicle body (not shown) by mounting assembly 17 and the outer end of member 18 is adapted to be secured to a vehicle steering arm or knuckle (not shown) by mounting assembly 19.

Two spaced apart bearing means act between the members 16 and 18 to promote telescoping movement of them, and should be spaced apart axially a distance sufficient to minimize the effects of bending loads. In the example illustrated in FIG. 1, these bearing means are provided in the form of a sleeve bearing 20 mounted by the inner end of member 16 and friction shoes 62 located adjacent the inner end of member 18. (The shoes 62 also serve as part of the damping assembly 14, as will be described presently.) The inner end portion of member 16 underlying bearing 20 is of enlarged diameter that registers with the diameter of the outer end portion of member 18 for a distance corresponding to the rebound stroke of assembly 10. Rebound stops 22 and 24 are formed by the closures of these enlarged diameter portions. These stops engage one another at the rebound position of the load bearing assembly 10 to prevent it from over-extending. Bearing 20 is held in position within a recess formed between two spaced apart shoulders 21 and 23. Bearing 20 may be formulated of any suitable low friction material, preferably a material having a coefficient of static friction that is less than its coefficient of dynamic friction.

The air spring assembly 12 acts between member 16 and the damping assembly 14. It is compressed axially between a first support 26 mounted by the outer end of member 16 and a second support 28 formed by the damping assembly 14, in response to an axially applied load on the strut. The air spring assembly includes a rolling lobe type air spring member 30 composed of reinforced elastomeric material that is or may be of well known design and construction. The edges of member 30 are bonded or otherwise sealed in an air tight manner to supports 26 and 28, and are secured in position by bands 31 and 33. Member 30 forms a rolling lobe portion 35 that moves over the exterior surface of a carrier 36 in a known manner as the strut extends and contracts. By controlling the internal pressure within member 30 in relation to the profile of carrier 36 along its middle and end portions 40 and 42, the pneumatic spring effects obtained may be varied. Accordingly, the construction and arrangement shown is illustrative and not limiting.

The air spring member 30 is replaceable, as are carrier 36 and support 26. Consequently, different pneumatic spring effects may be provided simply by replacing any, some or all of these elements. It likewise is possible to replace member 30 in case of a failure or expiration of its service life. To these ends, the strut is disassembled at the outer end of member 16, as will be described presently, and support 26 is removed along with carrier 36, with member 30 still secured between them. These elements now may be replaced, either separately or as a unit, depending upon the kind of air seals used at 31 and 33. The strut now may be reassembled and placed back into service, with a modified or refurbished air spring assembly, as the case may be.

In addition to carrier 36, the damping assembly 14 is made up of an annular flange 44 that is secured to and which projects transversely from the outer surface of member 18, and terminates in a cylindrical portion 46 that underlies carrier 36. Flange 44 encloses the lower end of carrier 36 to prevent entrance of dirt and other contaminants into the interior of the damping assembly 14. A low friction bearing surface is formed along the outer face of portion 46 to provide low friction sliding contact with the interior of carrier 36. Any suitable low friction material may be applied to the interior face of portion 46.

Still referring to the damping assembly 14 (FIG. 1), carrier 36 forms a first wedge ring 48 that includes a plurality of circumferentially spaced apart, recessed flats 50 that extend radially toward the center line of the load bearing assembly 10. These respectively register with and overlie five damper wedges 52 (FIG. 2) that are spaced apart at equal intervals about the circumference of one strut. A second wedge ring 54 underlies wedges 52, and includes flats 56 (FIGS. 1 and 2) identical to flats 50. Wedges 52 thus are guided by flats 50 and 56 for converging movement in an essentially radial direction. Low friction bearing surfaces are formed within all of the flats 50 and 56 to promote such movement. Any suitable low friction material may be applied to the flats to form these surfaces. Although the wedge ring 48 is illustrated as being formed by carrier 36, it could be formed as a separate part that registers with the interior surface of carrier 36.

When the strut is used as a front suspension for passenger vehicles, member 18 may shift rotatively about member 16 in response to turning input to the steering arm or knuckle. In this and other applications in which rotative shifting of member 18 occurs, it is desirable to isolate the damper wedges and the air spring assembly from the effects of this shifting. Accordingly, it presently is preferred to allow the wedge ring 54 to "float" with respect to member 18. The wedge ring includes a shoulder 57 that overlaps the inner end of member 18, together with a cross-sectional outline that registers with but is closely spaced from member 16 and portion 40 at 65 and 67, respectively. Consequently, there is essentially no contact between member 18 and ring 54 at any of these location except to position it in coaxial alignment with the inner end of member 18, as shown (FIG. 1). A flange 58 is secured to and projects transversely from the outer surface of member 18 a short distance from its inner end, as shown (FIG. 1). It is this flange that supports the wedge ring 54. Flange 58 includes a transverse radial portion 60 that underlies and supports ring 54 in a fixed axial position in load transmitting relation with member 18, as will be described presently. Flange 58 terminates in a cylindrical portion 61 that mounts a seal 63. This seal establishes an air tight seal with portion 40.

The interface between ring 54 and portion 60 acts to prevent or substantially eliminate transmission of all but axial loads from member 18 to ring 54. Low friction bearing surfaces generally similar to that formed at portion 46 are formed along the inner face of portion 60 and the exterior surface of member 18 from its inner end to the location of portion 60. These surfaces promote low friction sliding movement between portion 60, member 18 and the opposed faces of ring 54. Further, the spacing at 65 and 67 eliminates or minimizes any contact between ring 54, member 16 and portion 40. Consequently, ring 54 is isolated from most if not all of the effects of nonaxial forces that appear at the inner end of member 18. Similar isolation also is attained for carrier 36 and hence member 30. To minimize transmission of any such forces from portion 61 to portion 42, seal 63 should be of a type that has low shear resistance.

Each damper wedge 52 includes two inclined contact surfaces that are in face-to-face contact, respectively, with flats 50 and 56. The lateral surfaces of each wedge 52 are curved in general conformance with the curvatures of the outer surface of member 18 and the inner surface of portion 40. A damper shoe 62 is mounted by the interior lateral face of each wedge 52 and is of a width corresponding to the width of the wedge. In the example, each shoe is composed of the same material as bearing 20, and also serves as one of two bearing means acting between members 16 and 18. The exposed surface of each shoe constitutes a curved wear face that registers with the outline of the outer surface of member 18. When the shoes are urged into face-to-face contact with the outer surface of member 18, a frictional drag force is applied to member 18, resisting extension or contraction of the load bearing assembly.

The damper wedges 52 are urged inwardly by the wedging action produced between rings 48 and 54 in response to the axial force produced by carrier 36 being drawn toward the outer end of member 18. This is of course the result of the axial force generated by air spring assembly 12 being compressed between supports 26 and 28 in response to an axially directed load on the strut. The damper wedges are thus urged inwardly in unison, and produce an aggregate drag force that is proportional to the axial load applied to the strut. This drag force is controllable in accordance with the angles of inclination of the inclined contact surfaces of the wedge rings and damper wedges with respect to the longitudinal strut axis, or the coefficients of friction of the material forming these surfaces, or both. The drag force may even be controlled so that it varies depending upon whether the strut is being subjected to jounce or rebound conditions. For many passenger vehicle applications, for example, the drag force preferably is greater during rebound conditions than jounce conditions. One way to accomplish this is to vary the angles of inclination of the contact surfaces as illustrated in FIG. 1, so that the surfaces at 56 are disposed at a greater inclination to the longitudinal strut axis than the surfaces at 50.

As the damper shoes gradually wear away during use, the damper wedges are urged further inward. This compensates for the effects of wear so that the aggregate drag force obtained remains essentially constant, and further provides a discernable indication of shoe wear based upon the degree of inward wedge shift over the anticipated service life of the damper shoes. The damper shoes may be replaced when the wear exceeds acceptable levels by disassembling the strut, as will be described presently, removing carrier 36, and then replacing the existing damper wedges and worn shoes with fresh ones. This replacement may be effected on a periodic basis or when indicated by a sensor responsive to inward wedge shift.

Still referring to FIG. 1, the body mounting assembly 17 includes a tubular collar 70 that is surrounded by a flanged housing 72. These are of conventional design and are compatible with the body mounts customarily used for MacPherson struts. The space between the collar 70 and housing 72 is filled with elastomer 73 or other shock absorber material. The outer end portion of member 16 includes an annular shoulder 74 that is engageable with support 26, with member 16 extending through a central bore formed in support 26. The outer end portion of member 16 is threaded externally at 75 and terminates in an outer end 76 that includes flats 77 or is otherwise shaped to be engageable with an appropriate holding tool. Member 16 is secured in the position illustrated in FIG. 1 by a threaded sleeve 78 that is threaded onto member 16 and, when tightened, causes shoulder 74 to engage and be pulled against support 26. Thus, the load bearing assembly may be disassembled simply by loosening and removing sleeve 78, and then withdrawing the outer end of member 16 from collar 70. In the assembled position illustrated, end 76 projects outwardly beyond the end of sleeve 78 when sleeve 78 is fully tightened. This allows end 76 to be held against rotation by a holding tool when the strut is being mounted on or dismounted from a vehicle.

The air spring assembly is pressurized by air admitted to the interior of the load bearing assembly from an external pressure source (not shown). The outer end of member 16 is open, and admits air to the interior of the load bearing assembly. The outer end of member 18 is closed by a disc-like member 86. A plurality of air holes 88 allow air from the interior of member 16 to enter into and exit from the interior of the member 30. The air spring thus is and remains pressurized due to the closed air space provided by seal 63, despite relative movement of members 16 and 18 and carrier 36. The outer end of member 16 may include or be connected to suitable valving with which pressure air can be selectively supplied to and exhausted from the air spring assembly to provide desired pneumatic load bearing effects, and to control height levels.

While one presently preferred embodiment of this invention has been illustrated and described herein, variations will become apparent to one of ordinary skill in the art. Accordingly, the invention is not to be limited to the particular embodiment illustrated and described herein, and the true scope and spirit of the present invention are to be determined by reference to the appended claims.

The embodiments of the invention in which an exclusive property or privledge is claimed is defined as follows:

1. A suspension strut, comprising:
   a telescoping load bearing assembly including two outer ends, one of said outer ends including first spring support means;
   damping means for frictionally damping telescopic movement of said load bearing assembly in response to an axial load on said strut, said damping means including friction shoe means engageable with said load bearing assembly and a carrier movable with respect to said load bearing assembly and to said friction shoe means, said carrier having two ends and a profiled surface of revolution extending between said ends, one of said ends including second spring support means and being engaged with said friction shoe means at a region of contact on said friction shoe means, the other of said ends including spring stop means, said carrier being of sufficient length such that said spring stop means is spaced from said first spring support means by a distance greater than the distance between said first spring support means and said region of contact on said friction shoe means; and
   load bearing air spring means for providing the sole source of resilient load bearing support of said bearing assembly and for simultaneously providing a force operating said friction shoe means, said air spring means having opposite ends supported by said first and second spring support means and a rolling lobe portion supported by said profiled surface such that said air spring means urges said carrier away from said first spring support means and toward the other outer end of said load bearing assembly in response to an axial load, said rolling lobe portion engaging said spring stop means when said distance between said first and second spring supports is at a preselected minimum distance,
   wherein said load bearing assembly extends through said damping means and said air spring means, with said damping means being interposed between said air spring means and said load bearing assembly, and
   wherein said carrier causes said friction shoe means to engage said load bearing assembly while said rolling lobe portion of said air spring means simultaneously rolls over said profiled surface as said air spring means urges said carrier away from said first spring support means toward the other end of said load bearing assembly.

2. The strut of claim 1, wherein said load bearing assembly further includes two telescopically movable members, one of said members including said other outer end, and wherein said damping means further includes first wedge means axially movable with respect to the other of said members and interposed between said second spring support means and said friction shoe means, and second wedge means axially fixed with respect to said one member and interposed between said friction shoe means and said one member, said second spring support means being operative to urge said first wedge means toward said second wedge means as said second spring support means is urged toward said other outer end, said first wedge means and said second wedge means being operative to urge said friction shoe means inwardly into engagement with said other member as said first wedge means is urged toward said second wedge means.

3. The strut of claim 2, wherein said one member includes an inner end supporting said second wedge means, and said other member includes an inner end movable within said one member, and wherein said load bearing assembly further includes first bearing means supported by the inner end of said other member and acting between said other member and said one member, and wherein said friction shoe means is further operative as second bearing means acting between said one member and said other member.

4. The strut of claim 2, wherein said damping means further includes means interposed between said second wedge means and the inner end of said one member for transmitting essentially only axial loads therebetween.

5. The strut of claim 1, wherein said one outer end further includes an externally threaded tubular portion and a tool receiving portion, and wherein said first spring support means includes mounting means for mounting said portion to a vehicle body, said mounting means including a sleeve connector threadably securable to said tubular portion with said tool receiving portion projecting outwardly from said connector.

6. The strut of claim 5, wherein said load bearing assembly includes means directing air from said one outer end to said air spring means.

* * * * *